United States Patent [19]

Ikefuji

[11] Patent Number: 5,774,062
[45] Date of Patent: Jun. 30, 1998

[54] TAG RESPONSIVE TO HIGH-FREQUECY FOR VARYING CAPACITANCE OF TUNING CAPACITOR

[75] Inventor: Yoshihiro Ikefuji, Kyoto, Japan

[73] Assignee: Rohm Co., Ltd., Kyoto, Japan

[21] Appl. No.: 450,623

[22] Filed: May 25, 1995

[30] Foreign Application Priority Data

May 27, 1994 [JP] Japan .................................. 6-115554

[51] Int. Cl.⁶ .............................. G08B 13/00; H04Q 1/00
[52] U.S. Cl. .............................. 340/825.54; 340/825.49; 340/825.35; 340/505; 340/572; 363/125; 363/126
[58] Field of Search ........................ 340/825.54, 825.49, 340/825.35, 505, 572, 539, 573; 363/125, 126

[56] References Cited

U.S. PATENT DOCUMENTS

| | | | |
|---|---|---|---|
| 4,924,211 | 5/1990 | Davies | 340/573 |
| 5,266,925 | 11/1993 | Vercellotti | 340/572 |
| 5,446,447 | 8/1995 | Carney et al. | 340/572 |
| 5,448,220 | 9/1995 | Levy | 340/539 |
| 5,451,941 | 9/1995 | Lamazou et al. | 340/933 |
| 5,457,447 | 10/1995 | Ghaem et al. | 340/825.554 |
| 5,499,017 | 3/1996 | Beigel | 340/572 |
| 5,528,232 | 6/1996 | Verma et al. | 340/825.54 |

*Primary Examiner*—Michael Horabik
*Assistant Examiner*—Yonel Beaulieu
*Attorney, Agent, or Firm*—Fish & Richardson P.C.

[57] ABSTRACT

A memory stores optimum capacitance values of a variable capacitor obtained by measuring in advance depending on temperatures. In practical use, a controller reads an optimum capacitance value from the memory according to a temperature obtained by a temperature sensor, and sets a capacitance value of the variable capacitor to the optimum capacitance value. Thus, a tuning frequency can be always adjusted to the frequency of a radio wave transmitted. Also, deviation of the tuning frequency due to variations in the production process can be remedied by varying the capacitance value according to data stored in the memory.

8 Claims, 5 Drawing Sheets

| AMBIENT TEMPERATURE (°C) | HIGH-FREQUENCY TAG A ||| HIGH-FREQUENCY TAG B |||
|---|---|---|---|---|---|---|
| | TEMPERATURE DETECTOR OUTPUT | MEMORY ADDRESS | VARIABLE CAPACITANCE SETTING | TEMPERATURE DETECTOR OUTPUT | MEMORY ADDRESS | VARIABLE CAPACITANCE SETTING |
| 75 | 50 | 50 | 2 | 55 | 55 | 1 |
| 50 | 40 | 40 | 3 | 39 | 39 | 2 |
| 25 | 30 | 30 | 3 | 33 | 33 | 3 |
| 0 | 20 | 20 | 3 | 18 | 18 | 3 |
| -25 | 10 | 10 | 4 | 7 | 7 | 5 |

Fig. 4

TAG RESPONSIVE TO HIGH-FREQUECY FOR VARYING CAPACITANCE OF TUNING CAPACITOR

BACKGROUND OF THE INVENTION a) Field of the Invention

This invention relates to a tag responsive to high-frequency (hereinafter called RF-TAG) for effecting communications upon deriving electrical power from a radio wave sent via an antenna.

b) Description of the Prior Art

A conventionally used RF-TAG derives electrical power from a radio wave sent via an antenna and transmits information stored therein, and has been used for ski lift and railroad ticket gates.

This RF-TAG has a nonvolatile memory and a transmit/receive mechanism therein but not a power source such as a battery. It derives electrical power from the received radio wave (high frequency). Therefore, it is not required to have a battery therein and it is possible to exchange information for a long period. Also, it is supplied with electrical power when needed, so that it has a good energy efficiency even when its use is not frequent. Besides, it has an advantage that information is exchanged without physical contact, because a radio wave is used to exchange information.

However, this RF-TAG needs to receive a radio wave efficiently because it derives electrical power from the received radio wave. Specifically, the RF-TAG has a tuning circuit which consists of a tuning coil and a tuning capacitor. Also, the tuning circuit resonates with a radio wave having a tuning frequency. Therefore, sufficient electrical power cannot be attained unless the tuning frequency agrees with the frequency of a radio wave transmitted from a transmission antenna.

In view of the above, there are disadvantages that when the tuning frequency is deviated due to variations in quality of tuning coils and tuning capacitors during their production process, variations in performance due to temperature changes, and effects of a parasitic capacitance of an IC, an energy of the received radio wave is lowered and a distance (range) transmittable from the transmission antenna is shortened.

SUMMARY OF THE INVENTION

This invention aims to provide a RF-TAG capable of obtaining an optimum supply voltage and an information exchange system using it.

The RF-TAG according to this invention is provided with a tuning circuit which has a tuning coil and a tuning capacitor and receives a high frequency wave having a tuning frequency, a power source which rectifies the output of the tuning circuit to obtain an operating power, a receiver which receives electrical power from the power source to receive a signal from the tuning circuit, and a transmitter which receives electrical power from the power source to supply a transmission signal to the tuning circuit. Also, the tuning capacitor is characterized by that its capacitance is variable.

Thus, this invention can vary a capacitance of the tuning capacitor. A change in capacitance of the tuning capacitor can adjust the tuning frequency to suit a radio wave transmitted. Consequently, the variations occurring in the production process can be compensated to suitably receive the radio wave. Sufficient electrical power can be derived from the radio wave transmitted and a range of the transmitted radio wave can be increased.

In addition, the tag of this invention is provided with a temperature sensor which detects a temperature, a memory which stores capacitance values of the tuning capacitor optimum for temperatures, and a capacitance value adjusting means which adjusts the capacitance values of the tuning capacitor; and is characterized by that an optimum capacitance value of the tuning capacitor at a detected temperature is read from the memory and a capacitance value of the tuning capacitor is set to an optimum capacitance value.

Thus, optimum capacitance values corresponding to temperatures are stored in the memory to control the capacitance of the tuning capacitor according to temperatures, constantly enabling satisfactory receipt of a radio wave regardless of a change in temperature.

The information exchange system according to this invention is a system for exchanging prescribed information using a plurality of RF-TAGs which derive electrical power from a high-frequency wave transmitted from an antenna installed at a prescribed position, and effect communications with the antenna. These RF-TAGs are characterized to be the aforementioned RF-TAGs.

Thus, the information exchange system having a good efficiency of using a radio wave can be obtained using the RF-TAG.

BRIEF DESCRIPTION OF THE DRAWINGS

FIG. 4 is an explanatory view showing a stored content of a memory 16.

DETAILED DESCRIPTION OF THE PREFERRED EMBODIMENT

Figure 1:
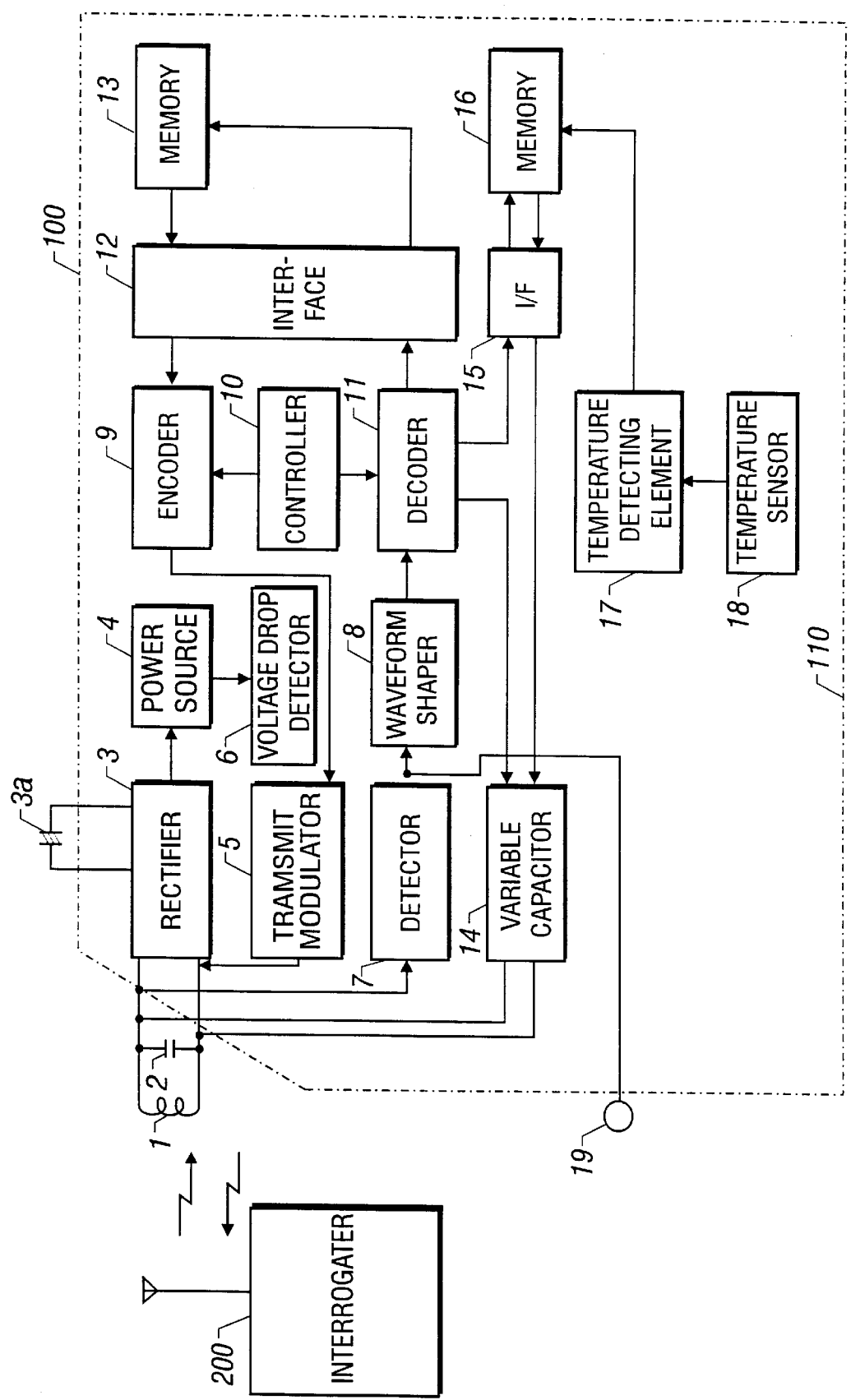
FIG. 1 is a block diagram showing an overall configuration of the RF-TAG of the invention.

The embodiment of the invention will be described with reference to the attached drawings. FIG. 1 is a block diagram showing an overall configuration of the embodiment, wherein a RF-TAG 100 exchanges a radio wave with an interrogator 200 having an antenna. The RF-TAG 100 is entirely molded with a resin and has a built-in integrated circuit (IC) 110.

A tuning coil 1 which works as a transmit/receive antenna has both ends connected to a tuning capacitor 2. The tuning coil 1 and the tuning capacitor 2 form a tuning circuit. A resonance frequency (tuning frequency) of the tuning circuit is determined by the tuning coil 1 and the tuning capacitor 2. The tuning capacitor 2 is connected in parallel with a variable capacitor 14 in this embodiment. Namely, these capacitors 2 and 14 form a tuning capacitor whose capacitance is variable. Thus, a combination of the tuning capacitor 2 and the variable capacitor 14 determines the capacitance of the tuning circuit and a tuning frequency. Adjusting the capacitance value of the variable capacitor 14 can adjust the tuning frequency of the tuning circuit to a desired level.

A rectifier 3 is connected to the tuning coil 1 to rectify tuning output. A capacitor 3a is a smoothing capacitor. The rectified output of the rectifier 3 is connected to a power source 4. The power source 4 supplies the RF-TAG 100 with electrical power for operating each circuit, and outputs a d.c. voltage supplied from the rectifier 3 at a prescribed constant voltage. A voltage drop detector 6 detects an output voltage drop of the power source 4 and stops operation when the supply voltage drops to a level which cannot ensure the operation of each circuit.

A detector 7 is connected to the tuning coil 1 to detect and pick up a signal having a prescribed frequency taken out by the tuning coil 1. A waveform shaper 8 is connected to the detector 7 to shape the waveform of the detected output. Namely, data to be processed by the RF-TAG 100 is basic digital data, which is shaped into a rectangular pulse signal by the waveform shaper 8.

A decoder 11 is connected to the waveform shaper 8 to decode a supplied pulse according to a prescribed communication protocol to obtain desired digital data. Generally, a serial-to-parallel conversion is performed at this point. A memory 13 is connected to the decoder 11 via an interface 12, and accessed by the output from the decoder 11. Namely, an address in the memory is outputted from the decoder 11, and data stored in the specified address is outputted from the memory 13.

An encoder 9 is connected to the interface 12 to encode data read from the memory 13 according to a prescribed communication protocol. Generally, the encoder 9 also performs a parallel-to-serial conversion. A transmit modulator 5 is connected to the encoder 9 to superimpose the encoded data on a carrier wave having a tuning frequency, thereby modulating the data. The tuning coil 1 is connected to the transmit modulator 5 to transmit a signal from the transmit modulator 5. The transmit radio wave is received by the interrogator 200.

A controller 10 controls the operation timing of the encoder 9 and the decoder 11.

Figure 2:
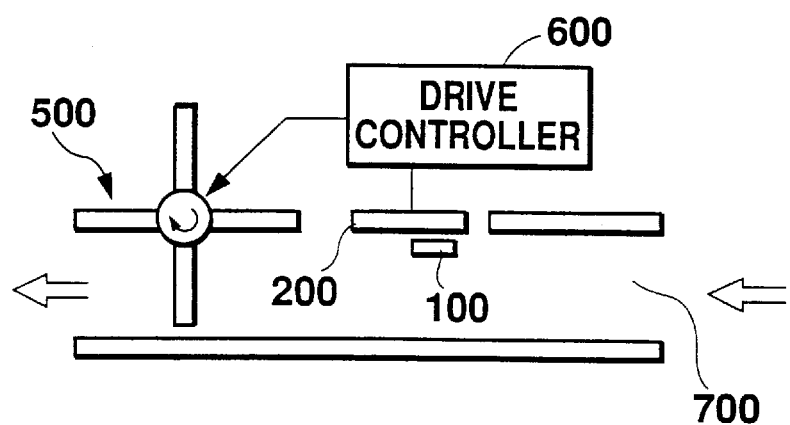
FIG. 2 is a diagram showing an overall configuration of the system.

FIG. 2 shows one example of the system consisting of the RF-TAG 100 and the interrogator 200. This example disposes the interrogator 200 on an edge of a path 700 to control the closing and opening of a gate 500, and is used for a ski lift gate for example. The interrogator 200 disposed on the edge superimposes a signal on a carrier wave having a prescribed tuning frequency to interrogate. When the RF-TAG 100 attached to an arm of a skier is close enough to the interrogator 200, the RF-TAG 100 uses a radio wave from the interrogator 200 as a power source, and power source 4 outputs prescribed electrical power, and each circuit in the tag 100 starts to operate. Then, contents corresponding to interrogations from the interrogator 200 are read from the memory 13 and transmitted to the interrogator 200. For example, data including a lift ticket type and expiration date are sent back to the interrogator 200 at the ski lift gate. The interrogator 200 sends the received response to a drive controller 600, which then controls the opening and closing of a revolving gate 500. In this example, when communications are made by an appropriate RF-TAG 100, the revolving gate 500 has its lock released to allow a skier to pass through.

The RF-TAG 100 of this embodiment has the variable capacitor 14 as described above. The variable capacitor 14 has the controller 10 connected via the decoder 11, and the controller 10 determines the capacitance of the variable capacitor 14.

A temperature sensor 18 is connected to the controller 10 via a temperature detecting element 17, allowing the detection of a temperature around the RF-TAG 100. Also, a memory 16 is connected to the decoder 11 via an interface 15. Thus, the controller 10 reads a prescribed address of the memory 16 according to the detected temperature, and determines a capacitance value of the variable capacitor 14 based on the obtained data. A terminal 19 outputs the detected level of the detector 7.

Figure 3:
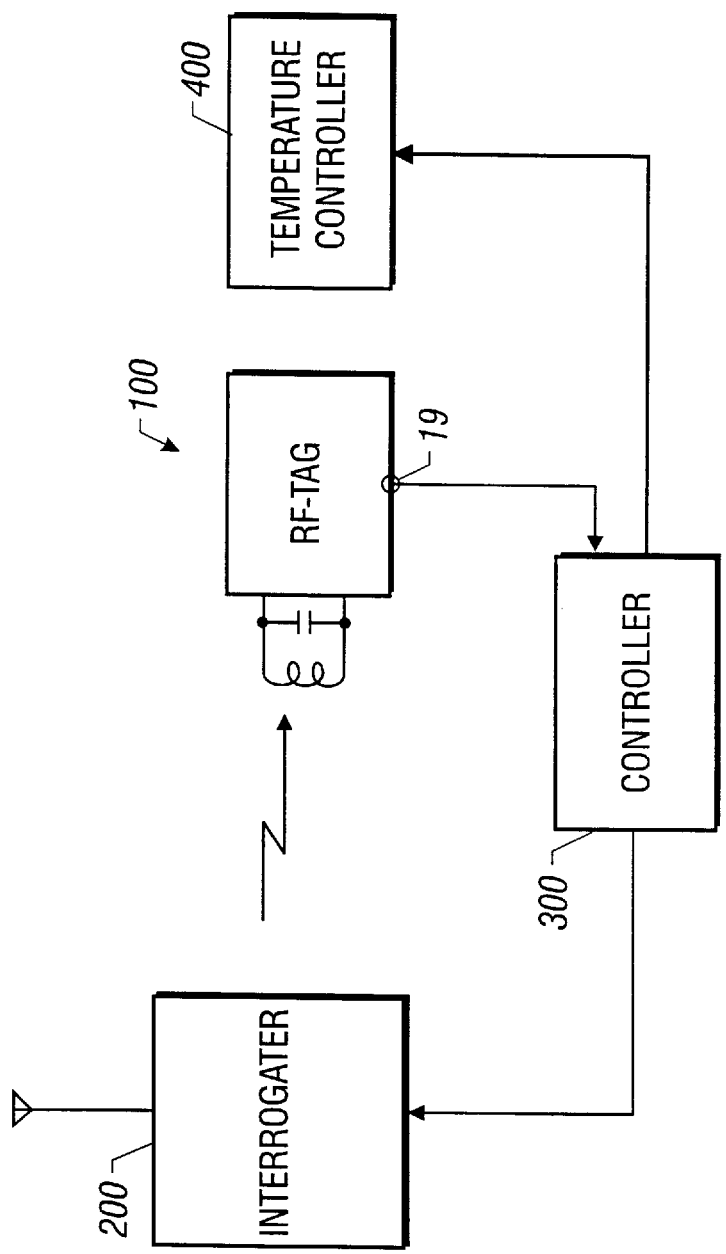
FIG. 3 is a block diagram showing the system for determining capacitance values.

Now, a content to be stored in the memory 16 will be described with reference to FIG. 3. As shown in FIG. 3, the RF-TAG 100 is placed close to the interrogator 200, and the controller 300 is connected to the terminal 19 of the RF-TAG 100. A temperature controller 400 is connected to the controller 300 to control an ambient temperature of the RF-TAG 100, and the interrogator 200 is also connected thereto.

The controller 300 keeps a temperature at a prescribed level using the temperature controller 400, and transmits a radio wave having a prescribed frequency from the interrogator 200. Upon receiving the radio wave, the RF-TAG 100 enters a detection level to the controller 300 via the terminal 19. The controller 300 sequentially varies the capacitance value of the variable capacitor 14 according to the signal from the interrogator 200. This is performed by recognizing the transmitted data by the controller 10 and varying the capacitance value of the variable capacitor 14 by the controller 300. The detection level when the capacitance value of the variable capacitor 14 is successively varied is recognized by the controller 300.

The temperature controller 400 changes the ambient temperature, and the above procedure is repeated. A higher detection level means that the tuning circuit is better tuned with a radio wave from the interrogator 200. The above test determines an optimum capacitance value of the variable capacitor 14 at each temperature.

The optimum capacitance values of the variable capacitor 14 determined as described above compensate the variations in quality of the RF-TAG in the production process. Namely, when an optimum capacitance value for conducting the above test is determined on each RF-TAG 100, it is a capacitance value for effecting optimum receiving by the tested RF-TAG, and faulty tuning due to variations in part quality during the production process can be remedied.

For example, FIG. 4 shows ambient temperatures, outputs of the temperature sensor 18 at the ambient temperatures, corresponding memory addresses, and optimum variable capacitance settings. These data are stored in the memory 16. Here, RF-TAG A and B have different optimum capacitance settings. Thus, problems due to the variations in the production process can be remedied. Also, according to output from the temperature sensor 18, the controller 10 reads a corresponding determined capacitance value from the memory 16 to set a capacitance value of the variable capacitor 14, so that a tuning frequency of the RF-TAG 100 is tuned with a radio wave from the interrogator 200, and a range of the radio wave is increased to allow preferable transmission and reception.

Figure 5:
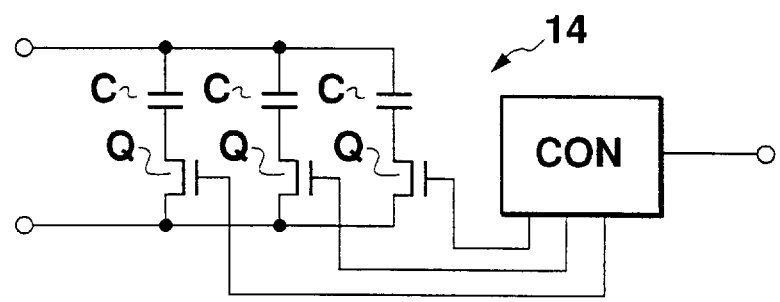
FIG. 5 is a diagram showing a configuration example of a variable capacitor 14.

FIG. 5 shows one example of the configuration of the variable capacitor 14. In this example, three capacitors C are connected in series with three MOS switches Q, which are connected in parallel with each other. A controller CON controls to turn on/off the MOS switches. More specifically, when the variable capacitance setting in FIG. 4 is "1", one of the three MOS switches Q is turned on. Thus, the capacitance value of the variable capacitor 14 connected in parallel with the tuning capacitor 2 becomes C. When the variable capacitance setting is "3", the three MOS switches Q are turned on. Thus, the capacitance value of the variable capacitor 14 connected in parallel with the tuning capacitor 2 becomes 3C. Accordingly, the capacitance value of the variable capacitor 14 can be controlled according to the signal from the controller 10. Setting the capacitances of the capacitors C to "1", "2" and "4", respectively allows setting of the capacitances to 0 to 7 according to the on/off control of the MOS switches Q. Also, the variable capacitor 14 may be a varicap if a capacitance can be varied. One end of the MOS switch Q may be extracted as a terminal to determine a value by an external capacitor. Another type of switch may be used instead of the MOS switch Q.

Figure 6:
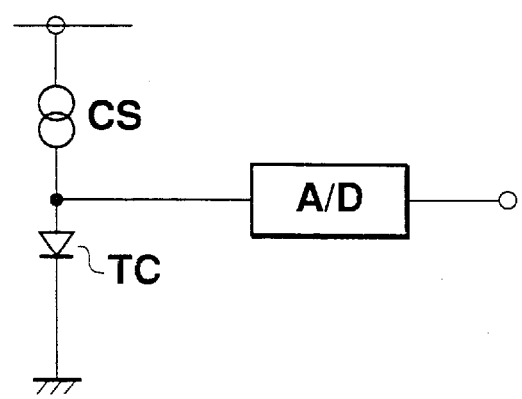
FIG. 6 is a diagram showing a configuration for measuring a temperature.

FIG. 6 shows an example of the configuration of the temperature sensor 18 and the temperature detecting element 17. In this example, a diode TC whose temperature drop varies according to a temperature is the temperature sensor 18, and a constant current source CS and an A/D converter form the temperature detecting element 17. The diode TC is disposed below the constant current source CS, and the diode TC has its voltage value varied according to temperature, so that an electrical potential on an anode side varies depending on temperature. Converting the electrical potential on the anode side of the diode TC to digital data by the A/D converter and outputting the data makes it possible to obtain digital data of temperatures. The data obtained is an output of the temperature sensor in FIG. 6. A thermistor whose resistance value varies depending on temperature may be used instead of the diode TC.

Thus, this embodiment tests the RF-TAG 100 one by one to check an optimum capacitance value of the built-in variable capacitor 14 at each temperature. Data of the test results are stored in the built-in memory 16. In a practical use, the capacitance of the variable capacitor 14 is set according to a temperature detected by the temperature sensor 18. Therefore, the capacitor's capacitance in the tuning circuit can be held at a prescribed level regardless of a temperature change, and the tuning frequency can be kept at a desired level. Thus, the radio wave from the interrogator 200 can be suitably received, and sufficient electrical power can be derived from the radio wave from the interrogator 200 to effect desired operations. The range of the radio wave from the interrogator 200 can be increased, so that an effective system using the RF-TAG can be provided. Data for compensating the variations in the production process regardless of a temperature may be written in the memory 16. Besides, data for compensating the variations in the production process at a certain temperature and standard temperature characteristics may be written in the memory 16.

The memories 13 and 16 must be nonvolatile memory, and preferably EEPROM. In the above description, the memories 13 and 16 and the interfaces 12 and 15 have been described to be different members, but may generally be made of one member. As indicated by an alternate long and short dash line in FIG. 1, the tuning coil 1 and the tuning capacitor 2 are externally attached, and the other members are built into the single IC 110.

Besides, in the above embodiment, the terminal 19 is disposed to output the detection level, but the terminal 19 may be omitted, and the detection level may be outputted from the tuning coil 1 to respond to the interrogations by the interrogator 200.

What is claimed is:

1. A RF-TAG for receiving a high frequency wave from an interrogator to derive electrical power from the high frequency wave and for communicating with the interrogator, the RF-TAG comprising:

a tuning circuit having a tuning coil and a tuning capacitor configured to receive a high frequency wave at a tuning frequency, said tuning capacitor having a variable capacitance value, a power source circuit connected to an output of the tuning circuit and configured to rectify the output to generate an operating power, a receiving circuit connected to receive the operating power from the tower source circuit and configured to receive a signal from the tuning circuit, a transmitting circuit connected to receive the operating power from the power source and configured to supply a transmission signal to the tuning circuit, a temperature sensor which detects a temperature, a capacitance value storage memory which stores optimum capacitance values of the tuning capacitor for different temperatures, and a capacitance value adjusting circuit which adjusts the capacitance values of the tuning capacitor, and is characterized in that:

an optimum capacitance value of the tuning capacitor at the detected temperature is read from the capacitance value storage memory and a capacitance value of the tuning capacitor is set to the optimum capacitance value.

2. A RF-TAG according to claim 1, wherein said tuning capacitor includes a plurality of capacitors and at least one switch, and said capacitance value adjusting circuit controls to turn on/off said switch to vary the capacitance of said tuning capacitor.

3. A RF-TAG according to claim 1, wherein said capacitance value storage memory is a read-only memory in which a relationship between temperatures and optimum capacitance values is stored in advance.

4. A RF-TAG according to claim 1, wherein said optimum capacitance values comprise values that adjust the tuning frequency to a predetermined value.

5. A system for exchanging prescribed information by receiving a high frequency wave from an interrogator disposed at a prescribed position to derive electrical power from the received signal and using a plurality of RF-TAGs which communicate with said interrogator, wherein each RF-TAG comprises:

a tuning circuit having a tuning coil and a tuning capacitor configured to receive a high frequency wave at a tuning frequency, said tuning capacitor having a variable capacitance value, a power source circuit connected to an output of the tuning circuit and configured to rectify said output to generate an operating power, a receiving circuit connected to receive the operating power from the power source circuit and configured to receive a signal from the tuning circuit, a transmitting circuit connected to receive the operating power from the power source and configured to supply a transmission signal to the tuning circuit, a temperature sensor which detects a temperature, a capacitance value storage memory which stores optimum capacitance values of the tuning capacitor for different temperatures, and a capacitance value adjusting circuit which adjusts the capacitance values of the tuning capacitor, and is characterized in that:

an optimum capacitance value of the tuning capacitor at the detected temperature is read from the capacitance value storage memory and a capacitance value of the tuning capacitor is set to the optimum capacitance value.

6. The system of claim 5, wherein said optimum capacitance values comprise values that adjust the tuning frequency to a predetermined value.

7. A RF-TAG for receiving a high frequency wave from an interrogator to derive electrical power from the high frequency wave and for communicating with the interrogator, comprising:

a tuning circuit having a tuning coil and a tuning capacitor configured to receive a high frequency wave at a tuning frequency, said tuning capacitor having a variable capacitance value;

a power source circuit connected to an output of the tuning circuit and configured to rectify the output to generate an operating power;

a receiving circuit connected to receive the operating power from the power source circuit and configured to receive a signal from the tuning circuit; and a transmitting circuit connected to receive the operating power from the power source and configured to supply a transmission signal to the tuning circuit;

wherein said variable capacitance of said tuning capacitor is adjustable to adjust the tuning frequency to a predetermined value.

8. A system for exchanging prescribed information by receiving a high frequency wave from an interrogator disposed at a prescribed position to derive electrical power from the received signal and using a plurality of RF-TAGs which communicate with said interrogator, wherein said each RF-TAG comprises:

a tuning circuit having a tuning coil and a tuning capacitor configured to receive a high frequency wave at a tuning frequency, said tuning capacitor having a variable capacitance value;

a power source circuit connected to an output of the tuning circuit and configured to rectify the output to generate an operating power;

a receiving circuit connected to receive the operating power from the power source circuit and configured to receive a signal from the tuning circuit; and a transmitting circuit connected to receive the operating power from the power source and configured to supply a transmission signal to the tuning circuit;

wherein said variable capacitance of said tuning capacitors of said RF-TAGS are adjustable to adjust the tuning frequency to a predetermined value.

* * * * *